Aug. 30, 1966    L. A. BETTCHER    3,269,010

TRIMMING, SLICING AND BONING DEVICE

Filed April 28, 1964

INVENTOR.
LOUIS A. BETTCHER
BY
Williams, David,
Hoffmann & Yount
ATTORNEYS

United States Patent Office 3,269,010
Patented August 30, 1966

3,269,010
TRIMMING, SLICING AND BONING DEVICE
Louis A. Bettcher, Amherst, Ohio, assignor to Bettcher Industries, Inc., Vermilion, Ohio, a corporation of Ohio
Filed Apr. 28, 1964, Ser. No. 363,162
6 Claims. (Cl. 30—276)

The present invention relates to cutting devices and more particularly to a meat cutting device or tool adapted to be manually held and manipulated for the quick and easy cutting of meat including removal of meat from animal carcasses and/or meat remnants from animal bones.

The principal object of the present invention is the provision of a new and improved cutting device comprising an annular support means having a rotatable annular blade or cutter provided with a cutting edge projecting therefrom, and which device is of a simple and economical construction and effective to slice or trim a slab of meat as well as remove meat remnants from bones, etc.

Another object of the present invention is the provision of a novel annular cutter or blade for use in a cutting device, of the character referred to, which produces an effective trimming and slicing action during relative translatory movement between the rotating blade and the work body and which facilitates the removal of meat remnants from the bones.

Additionally this invention provides novel features of construction with respect to the form of the support means and the mounting of the blade therein and by which advantageous results are achieved in the operation of the blade as well as in the removability thereof for cleaning, sharpening and the like.

Other objects, novel characteristics and advantages of this invention will be apparent from the following detailed description and in the accompanying drawings forming a part of this specification, and in which.

Figure 1:
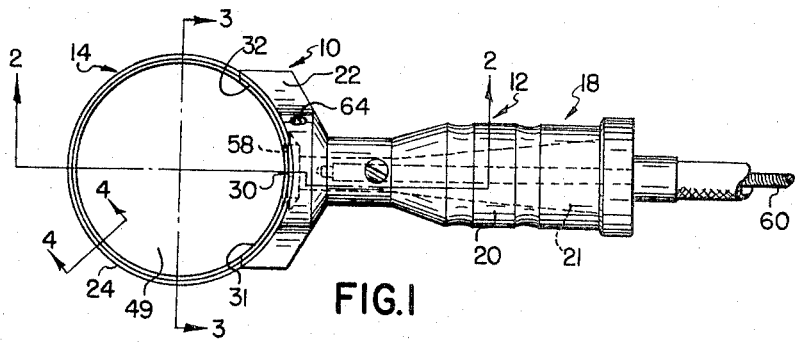
FIG. 1 is a top plan view of a cutting device embodying this invention.

As a highly practical embodiment of this invention, the drawings show a cutting device or tool 10 which comprises in general a handle means 12, an annular support means 14 connected with the handle means, a rotatable cutter or blade 16 carried and supported by the support means and a drive means 18 located within said handle and operatively connected to said cutter 16 for rotating the same.

The handle means 12 comprises an elongated hollow stem portion 20 of a suitable size and shape to enable it to be conveniently grasped by the human hand and has a longitudinal passage 21 extending therethrough. The handle 12 also comprises a sector portion 22 at one end thereof and integral therewith to which the annular support means 14 is adapted to be secured. The inner end of the handle, that is, the end having the sector portion 22, contains a circular recess 23 with which the longitudinal passage 21 communicates, and for a purpose to be hereinafter described.

Figure 2:
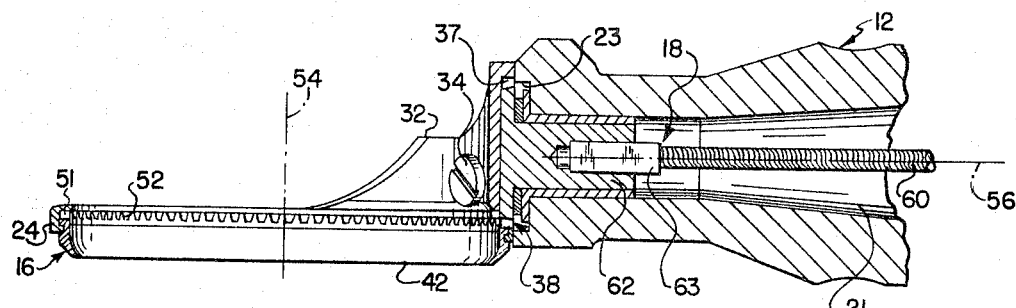
FIG. 2 is a sectional view taken along line 2—2 of FIG. 1.
Figures 3, 4:
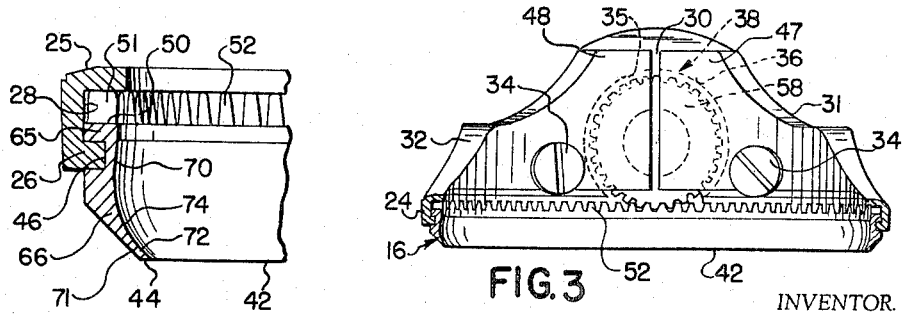
FIG. 3 is a sectional view taken along line 3—3 of FIG. 1.
FIG. 4 is an enlarged sectional view taken along line 4—4 of FIG. 1.

The support means 14 comprises an annular or circular ring shaped member 24 having, as viewed in FIGS. 2-4, a pair of horizontally disposed but vertically spaced apart annular flanges 25, 26 defining an annular recess or channel 28 therebetween. The member 24 has an axial split or gap 30 at one point of its circumference and is provided with axially extending sector shaped flanges or lugs 31 and 32 located on opposite sides of the split 30. The lugs 31, 32 together have a shape which is complementary with the shape of the inner surface of the sector portion 22 of the handle means 12, and are adapted to be secured to the sector portion 22 by screws 34, which extend through a suitable opening in the lugs 31, 32 and are threadably secured within aligned threaded openings formed within the sector portion 22. The lugs 31 and 32 have semi-circular recesses 35 and 36, respectively, located on opposite sides of the split 30 which together form a circular recess 37. The recess 37 along with the recess 23, which is aligned therewith, form a gear chamber 38.

The blade 16 comprises a one-piece circular or ring-shaped metal member having an annular or generally cylindrically shaped body portion terminating in a radially inwardly presented annular cutting edge 42 at one end 44 thereof. The blade 16 is adapted to be rotatably supported by the flange 26 of the support means 14. To this end, the annular body of the blade 16 is provided with an external circumferential groove 46 which slidably receives the flange 26 of the annular member 24.

The annular ring member 24 is resilient and functions as a snap ring, that is, it can be circumferentially expanded by flexing outwardly the ends 47, 48 thereof located on opposite sides of the split 30 and snapped back to its original position by releasing the ends. From the foregoing, it is apparent that the cutter or blade 16 is secured to the ring member 24 by flexing outwardly the ends 47, 48 of the ring member 24, positioning the annular groove 46 of the blade 16 adjacent the flange 26 and releasing the ends 47, 48 to allow the member 24 to snap back to its original position and position the flange 26 within the groove 46.

The engagement of the flange 26 in the groove 46 not only supports the blade 16 but also provides a bearing means for absorbing the axial thrust of the blade when the cutting edge 42 thereof is advanced against material to be cut during the manipulation of the device 10. The blade 16 and the ring member 24 have a common central opening 49 for the passage of severed material or meat axially therethrough and themselves lie in a surrounding relation to, and wholly outside of, such common opening.

As best viewed in FIG. 4, the portion of the blade 16 extending or disposed above the annular groove 46 is slidably received within the recess 28 and the annular end 50 thereof facing the flange 25 is provided with upstanding gear teeth 51, which teeth extend therearound to constitute a gear member or annular gear 52. The teeth of the gear 52 are preferably cut directly in the end 50 of the generally cylindrically shaped body portion of the blade 16 and are housed completely within the annular recess 28 of the support member 24.

The blade 16 is adapted to be rotated in the direction of its circumference, which rotation produces a relative circumferential sliding movement between the groove 46 thereof and the flange 26. The rotation of the blade 16 is about a central axis 54, which axis is common to both the blade 16 and the annular support member 24, extending transversely preferably perpendicularly, to the axis 56 of the passage or opening 21 of the handle means 12. The central axis 54 extends substantially normal to the longitudinal plane containing the support member 24 and the blade 16. It will also be observed that when the support ring 24 and the blade 16 are in their assembled relation on the handle means 12, the substantially straight stem portion of the latter extends away from the support ring and blade in a substantially radial edgewise direction.

Rotation is imparted to the blade 16 by a rotary driving means located within the handle means 12 and which comprises a driving gear or pinion 58 in meshed driving engagement with the ring gear 52 and located within the gear chamber 38 formed by the recesses 37 and 23. The driving pinion 58 is connected with a drive means contained in the handle means 12, in this case a flexible rotatable drive shaft 60 extending through the passage 21 of the handle means. For the purpose of the connection with the shaft 60, the pinion 58 preferably has a stem portion 62 containing a non-circular socket into which a non-circular end portion 63 of the shaft 60 is engaged. Any suitable means may be employed for rotating the flexible drive shaft 60.

The handle means 12 contains a threaded opening 64 in the sector portion 22 which communicates with the gear chamber 38 formed by the recesses 37 and 23. A suitable housing having a collapsible container containing a suitable lubricant may be provided and threadably secured within the opening 64. The container can be manually collapsed to force the lubricant therefrom for lubricating the gears 52 and 58.

An important feature of the present invention is the shape or configuration of the novel blade 16. The shape of the blade is such that it will effectively produce a trimming or slicing action during relative translatory movement between the rotating blade and the work body as well as effectively and rapidly remove meat remnants from bones, etc. The annular body of the blade 16, shown, comprises a first portion 65 having a cylindrically shaped outer surface and a generally divergent inner surface 70 which diverges in an axial direction from the end 50, when viewed from above the gear 52 and a second generally convergent portion 66 having an outer bevel shaped or tapered surface 71 and an inner surface having a tapered portion 72 which diverges in an axial direction from the cutting edge 42 and extends substantially parallel to the outer surface 71 and an arcuate portion 74 which smoothly joins the inner surface portions 70 and 72. The overall contour or shape of the inner surface of the blade 16 is such that it is concave when viewed from the axis 54.

The radial thickness of the blade 16 adjacent the cutting edge 42 is relatively small as compared to the radial thickness of the first portion 65, the thickness of the upper part of the latter, however, as viewed in FIG. 4, being less than the radial depth of the flange 25. The tapered outer and inner surfaces 71 and 72, respectively, of the second generally convergent portion 66 preferably form or extend at an angle of 45° with respect to the axis 54. Although such a 45° angle has been found to be highly satisfactory in actual practice, the taper can be varied somewhat by the use of either a larger or a smaller angular value. The annular cutting edge 42, which has a flat surface, constitutes the innermost annular portion of the blade 16 and occupies a radially disposed, or radially inwardly presented, location or position on the small diameter end 44 of the blade. The location of the cutting edge 42 in this position will result in the cutting edge being exposed in an effective manner for engagement with the work body to be cut, but will still be in a shielded position against injurious personal contact therewith by reason of the fact that it is on the inside of the small diameter end 44.

Upon relative translatory movement between the blade 16 and a work body, such as a slab of meat, as by the cutting device being drawn across the body with the annular support member 14 moving in its own plane and substantially parallel to the surface portion of the work body from which the section is to be severed, the cutting edge 42 will bite into the work body with an efficient cutting action in the nature of a slicing action. The cutting action of the edge 42 is particularly effective as a slicing type of cutting action because of the rotation imparted to the blade 16 during the translatory movement. Since the cutting edge 42 is presented substantially radially inwardly on the blade and is located at or adjacent the start of the tapered portion 72, the severed material will pass readily through the common opening 49 as the relative translatory movement between the cutting device and the work body progresses.

It will be observed that since the cutting edge 42 is on the small diameter end 44 of the blade 16 and since the inner surface 72 is divergent in character, the diameter of the opening 49 above the cutting edge, as viewed in the drawings, is greater than the diameter of the opening 49 at the cutting edge. This increase in the size of the opening 49 assists and facilitates the passage of the material through the opening. From the construction of the cutting device as shown in the drawings and described above it will be recognized that the opening 49 is substantially greater in diameter than the combined axial length of the ring member 14 and the blade 16 and that this size relationship is further conducive to the free passage of severed material through the opening.

The blade 16 is rigid in character and of a relatively short axial length, such that it will have a minimum amount of resistance to passage through the meat remnant being cut or severed from a supporting bone. This short axial length characteristic of the blade 16 also facilitates the movement of the blade into and through bone depressions or concavities, such as commonly occur in or between the neck bones and other bones having the meat remnants to be removed. It is also an important characteristic of the cutting device 10 that the blade 16 and the supporting means 14 are of a diameter or radius of curvature such as the blade will be engaged to best advantage, in the majority of the bone cavities or recesses having meat remnants to be removed.

The passage of severed material through the opening 49 is further facilitated by the provision of the inner surface 70 of the first portion 65, which surface is generally convergent when viewed from the cutting edge 42. This portion will guide the severed meat or material through the opening 49 toward the axis 54 and thereby facilitate the movement of the severed material through the opening as well as guide the severed material in such a manner as to keep it free and clear of the annular gear 52. The generally convergent portion 66 of the blade 16 is made such that it will have a substantially uniform radial thickness at all circumferential points therearound for a portion of its length. This uniform thickness for the blade 16 is advantageous in that it facilitates the construction of the blade, as well as the resharpening thereof by which the cutting edge 42 can be maintained in a sharp and effective condition even though the blade becomes somewhat shortened in its axial dimension by reason of successive sharpening operations performed thereon.

While in the preferred embodiment, the outer surface 71 of the generally convergent portion 66 has been illustrated as a beveled or tapered surface, it will of course be understood that the outer surface could be curved, etc.

From the accompanying drawings and the foregoing detailed description it will now be readily understood that this invention provides a cutting device of a highly practical and effective character which can be used in an effective manner for trimming and slicing meat bodies and various other materials as well as for removing meat remnants from bones. It will also be recognized that the novel cutting blade has been provided which greatly facilitates the above cutting operations and which blade can be readily attached and detached from the support means of the cutting device.

Although the cutting device of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. An annular cutter adapted to be rotatably supported by an annular support means of a manually manipulatable cutting tool for cutting meat comprising an annular member having a through axial opening through which severed meat is adapted to pass; said member comprising a generally cylindrically shaped portion and a generally convergent portion terminating in an annular radially inwardly extending cutting edge at its free end; said annular member having a concave inner surface as viewed from the axis of the through axial opening, said convergent portion having a substantially uniform radial thickness for a portion of its length proceeding from the cutting edge toward said cylindrically shaped portion and with the radial thickness of said convergent portion being less than the radial thickness of said cylindrically shaped portion.

2. An annular cutter adapted to be rotatably supported by an annular support means of a manually manipulatable cutting tool for cutting meat comprising an annular member having a short axial length in relation to its diameter and a through axial opening through which severed meat is adapted to pass; said member comprising a generally cylindrical shaped portion and convergent portion terminating in an annular radially inwardly disposed cutting edge at its free end; said convergent portion having a concave inner surface smoothly joining said cutting edge with the axially divergent inner surface of said first portion of said member.

3. An annular cutter adapted to be rotatably supported by an annular support means of a manually manipulatable cutting tool for cutting meat comprising an annular member having a short axial length in relation to its diameter and a through axial opening through which severed meat is adapted to pass; said member comprising a first portion having a generally cylindrical outer surface and a generally axially divergent inner surface, and a second portion having a convergent outer surface and an inner surface comprising a first portion extending generally parallel with said outer surface and an arcuate portion for smoothly joining said first portion of said inner surface of said second portion with the inner surface of said first portion; said second portion of said member terminating in an annular radially inwardly extending cutting edge at its free end.

4. An annular cutter as defined in claim 3 wherein said first portion of said inner surface of said second portion extends at a 45° angle with respect to said outer cylindrical surface.

5. In a cutting tool adapted to be manually held and manipulated for cutting meat; annular support means lying substantially in a flat plane and having hollow handle means rigid therewith; an annular cutting blade carried by said support means for rotation in the direction of its own circumference; driving means extending within said handle means and operatively engaged with said blade for imparting rotation thereto; said support means and blade extending in a continuous relation therearound and lying outside of a common axial opening through which the severed material passes during the cutting thereof from said body; said blade having a generally hollow cylindrically shaped portion and a hollow convergent free end portion projecting from said support means and terminating in a radially inwardly presented annular cutting edge; said convergent portion of said blade having a radial thickness which is less than the radial thickness of said cylindrically shaped portion and a concave internal surface smoothly joining said cutting edge with the inner surface of the cylindrical portion.

6. In a cutting tool adapted to be manually held and manipulated for cutting material from a work body; annular support means lying substantially in a flat plane and having hollow handle means rigid therewith and projecting substantially radially therefrom; an annular cutting blade carried by said support means for rotation in the direction of its own circumference; driving means extending within said handle means and operatively engaged with said blade for imparting rotation thereto; said support means and blade extending in a continuous rotation therearound, and lying outside of a common axial opening through which the severed material passes during the cutting thereof from said body; said blade having a generally hollow cylindrically shaped portion having a generally cylindrical outer surface and a generally axially divergent inner surface, and a convergent portion having a convergent outer surface and an inner surface comprising a first portion extending generally parallel with said outer surface and an arcuate portion for smoothly joining said first portion with the inner surface of said cylindrical portion; said convergent portion terminating in an annular radially inwardly extending cutting edge at its free end.

References Cited by the Examiner
UNITED STATES PATENTS

| 1,804,977 | 5/1931 | Gallison et al. | 17—4 X |
| 2,359,584 | 10/1944 | Roehner | 30—34 |
| 2,556,208 | 6/1951 | Musso | 30—43.6 X |
| 2,598,711 | 6/1952 | Musso | 30—43.6 X |
| 2,827,657 | 3/1958 | Bettcher | 90—12 X |
| 3,024,532 | 3/1962 | Bettcher | 30—276 |

FOREIGN PATENTS

| 1,064,216 | 8/1959 | Germany. |
| 353,995 | 6/1961 | Switzerland. |

WILLIAM FELDMAN, *Primary Examiner.*

JAMES L. JONES, JR., *Examiner.*